Patented Apr. 21, 1931

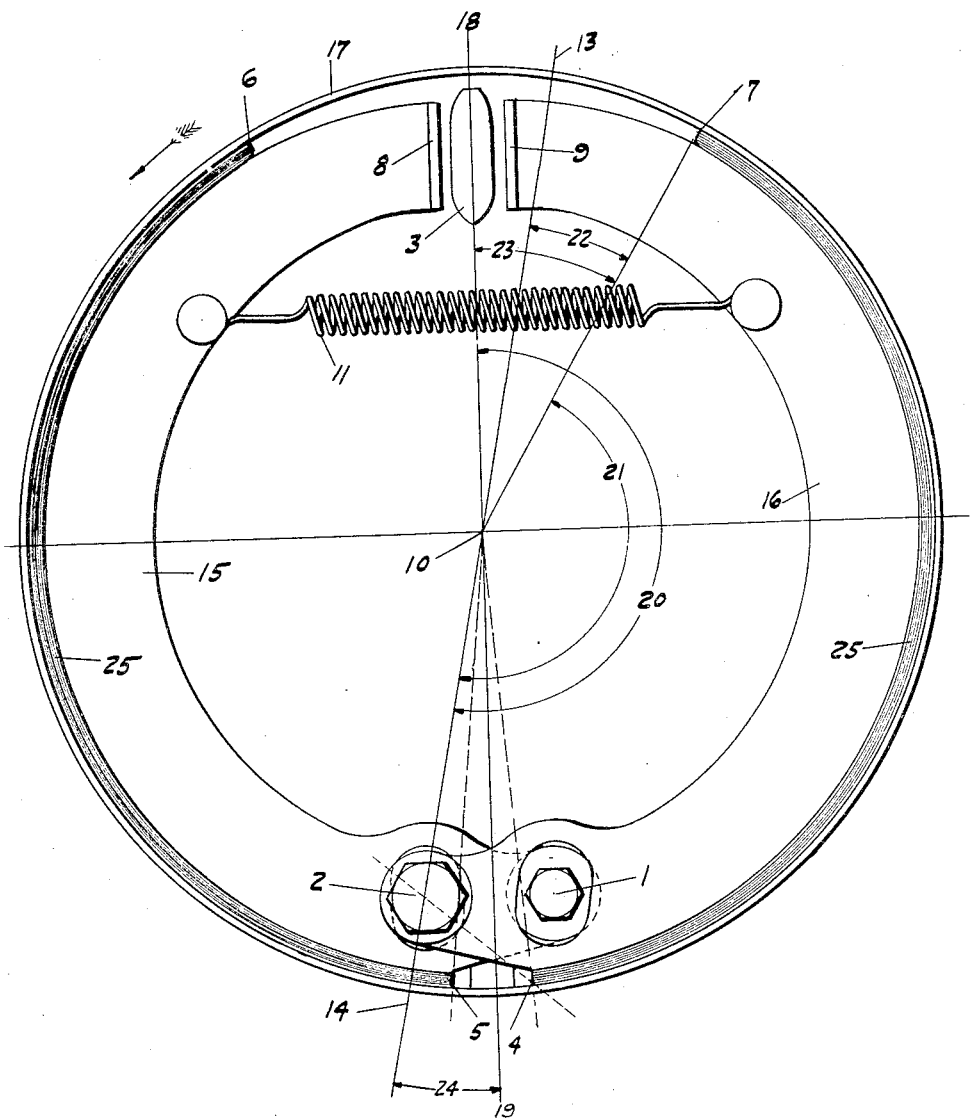

1,801,397

UNITED STATES PATENT OFFICE

GEORGE JOSEPH THOMAS, OF SOUTH BEND, INDIANA, ASSIGNOR TO BENDIX BRAKE COMPANY, OF CHICAGO, ILLINOIS, A CORPORATION OF ILLINOIS

BRAKE

Application filed October 16, 1924. Serial No. 743,877.

This invention relates to improvements in brake mechanisms, particularly those used in connection with automotive vehicles, and I have chosen to illustrate my invention in connection with brakes of the internal expanding type, wherein a rotatable member, in the shape of a wheel drum, is adapted to be engaged by the brake shoes which are moved into engagement therewith by any suitable means, such as a cam.

It is the principal object of my invention to arrange the brakes so that a maximum arcuate length of the brake lining, preferably carried on the shoes, may be utilized thereby increasing the effectiveness of the brakes as well as increasing the life of the brake lining. In order to carry out the principal object of my invention, much attention must be paid to the arrangement of the various parts in order that proper clearance, between the brake shoes and the rotatable member, may be obtained, for the matter of clearances at the different points between the brake shoes and the drum has been one of the difficulties heretofore encountered, and has acted in prior art structures to reduce the arcuate length of the brake lining in contact with the brake drum.

Having in mind the same general object, an important feature of the invention relates to anchoring one of two jointly-operable shoes between the ends of the other shoe, thus in effect overlapping the shoes and eliminating the idle drum surface adjacent the anchor.

The figure shows an internal expanding two shoe brake, the shoes being in engagement with the drum, while the actuating means is in its released position.

In the drawings, wherein like numbers refer to corresponding parts in the various views, 17 is a member such as a drum adapted to rotate in the direction of the arrow for forward movement. Within the drum 17 is positioned two brake shoes 15 and 16, each having a brake lining 25 attached thereto in any suitable manner. As illustrated the brake shoe 15 is anchored at 1, and the shoe 16 is anchored at 2, to some suitable stationary member. Positioned between the ends 8 and 9 of brake shoes 15 and 16 is an actuating means in the form of a cam 3. A spring 11 is used for returning the brake shoes 15 and 16 to the position shown in Fig. 2, after they have been released by the actuating means 3. It will be understood that the anchor pins 1 and 2 may be provided with any suitable adjusting means such as an eccentric bearing, but they are so secured to the brake supporting means as to provide a rigid pivot during the brake operation.

The object of over-lapping the anchor pins 1 and 2 is for the purpose of bringing the brake lining, at the heel of the shoes 15 and 16, relatively close together so that initial contact of the heel of the shoe on the drum may be assured, for in ordinary construction very little braking effect is obtained at the heel of the shoe. The problem to be solved is a best arrangement of the anchor points with reference to each other, and the proper arcuate length of the brake lining to obtain the necessary clearance at the ends of the brake lining which must be arranged to give the maximum braking effect. By way of reference the ends of the brake lining of the shoe 15, is designated by the numbers 5 and 6, while that on shoe 16 is designated by the numbers 4 and 7. In order to obtain a maximum clearance at the point 4, for a given angular movement of the shoe 16, and with a minimum distance between the anchor points 2 and 4, which condition will give the maximum peripheral length of brake lining on the heel of the shoe 16, the angle designated in the drawing as 20, must be more than 180°. It should be noted that the distance from the center 10 to the anchor point 2, is limited by structural considerations, that is to say, it is practically impossible to have the pivot at 2 as close to the periphery of the brake lining as is theoretically desirable from the point of view of obtaining clearance. Furthermore, from the point of view of obtaining brake power, the anchor point 2 should be kept away from the periphery of the drum as such positioning gives an eccentric wedging action which is of value in obtaining heavy braking for relatively light pedal pressure. It will be obvious that the greater the angle 20 becomes, the greater will be the angular clearance at 4 for a given angular movement of shoe 16 in a contra-clockwise direction. Concerning the clearance at point 7, it is to be noted that the point 13, which is an extension of the line 2—10, is 180° from the point 14 where the line 2—10 intersects the drum opposite the point 13. In order to obtain clearance at the point 7, at the toe of the shoe 16, it is first necessary to see that the angle, designated 21 on the drawing, is less than 180°; secondly, in order to obtain maximum clearance with a minimum angular movement of the shoe 16, this angle should be as much less than 180° as is possible. This may be done in two ways: first, by increasing the angle, designated 22; secondly, by moving point 2 in a clockwise direction. Both of these movements tend to reduce the brake lining in contact with the drum, the first as it moves point 7 in a clockwise direction, and the second as it moves point 4 in a contra-clockwise direction. This has resulted in conventional two shoe brakes with a relatively small amount of lining in engagement with the drum. It will therefore, be seen that in my invention of over-lapping the shoes at their anchor points, that at these anchor ends the shoe clearance may be obtained with the lining on the two shoes brought very nearly together. In practice, I have found that to obtain maximum brake lining in contact with the drum, the angle designated 24 should preferably lie between 10 and 15° while, the angle designated 23 will then vary between 25 and 35°. This condition will give an appropriate minimum clearance at point 4 and slightly more at point 7 with the angular positions of the various points shown in the drawing. This clearance condition is based on a one degree movement of the brake shoes about their pivot points.

For different degrees of accuracy in manufacture, and for differnt braking power required with different makes of linings, drums, etc., the various dimensions, movements, and clearances may be varied to suit the particular case, but the essence of my invention lies in the overlapping of the shoes at their anchor points, which creates a new condition in internal expanding brakes and the other variables introduced serve only to enhance the effect of the over-lapping shoes. It should be noted in particular, that whereas in ordinary brake, approximately 235° of total brake lining is obtained in contact with the drum, with my construction, it is possible to obtain 280° or more.

It should be clearly understood that the drawings are merely illustrative of my invention and the details for carrying out the same may be varied over a wide range, as for example, the brake operating mechanism may be actuated by mechanical, fluid or electrical means.

Most of the subject-matter originally disclosed in this application has been transferred to my continuing applications No. 178,193, filed March 25, 1927, now Patent No. 1,741,168, granted Dec. 31, 1929, and covering the general arrangement of the brake, and No. 349,746, filed March 25, 1929, covering a semi-flexible brake shoe. The present application has been limited to the arrangement in which the anchor for one shoe passes through an opening in the other shoe.

Having thus described my invention, what I claim is:

A brake comprising, in combination, a drum, a pair of shoes having radial webs, an anchorage for each shoe between the ends of the other shoe and passing through an opening in the web of the other shoe, and means for forcing the shoes against the drum.

In testimony whereof, I affix my signature.

GEORGE JOSEPH THOMAS.